(12) United States Patent
Sugano

(10) Patent No.: US 8,469,249 B2
(45) Date of Patent: Jun. 25, 2013

(54) CART ATTACHMENT FOR A BACKPACK

(75) Inventor: Alan Sugano, Chino, CA (US)

(73) Assignee: Pecoware Company, Inc., Chino, CA (US)

( * ) Notice: Subject to any disclaimer, the term of this patent is extended or adjusted under 35 U.S.C. 154(b) by 849 days.

(21) Appl. No.: 12/220,660

(22) Filed: Jul. 28, 2008

(65) Prior Publication Data

US 2010/0019011 A1   Jan. 28, 2010

(51) Int. Cl.
*A45F 3/04* (2006.01)
*A45C 13/38* (2006.01)

(52) U.S. Cl.
USPC ........... 224/576; 224/584; 224/627; 190/18 A

(58) Field of Classification Search
USPC . 224/576, 584, 153, 627, 633, 652; 190/18 A
See application file for complete search history.

(56) References Cited

U.S. PATENT DOCUMENTS

| | | |
|---|---|---|
| 2,401,986 A | 6/1946 | Talbott |
| 3,144,014 A | 8/1964 | Mantell, Jr. |
| 3,550,997 A | 12/1970 | Strand |
| 4,362,307 A | 12/1982 | Nakatani |
| 4,368,835 A | 1/1983 | Murphy |
| 4,593,841 A | 6/1986 | Lange |
| 5,492,254 A | 2/1996 | Challoner et al. |
| 5,676,286 A | 10/1997 | Song |
| 5,934,533 A | 8/1999 | Callanan |
| 6,082,757 A * | 7/2000 | Lin ............................. 280/654 |
| 6,179,176 B1 | 1/2001 | Saggese et al. |
| 6,550,651 B1 | 4/2003 | Murdoch et al. |
| 6,561,395 B2 | 5/2003 | Lim et al. |
| 6,997,507 B2 * | 2/2006 | Rhee ............................ 297/129 |
| 7,036,641 B2 | 5/2006 | Russo et al. |
| 7,036,699 B1 * | 5/2006 | Hay et al. ...................... 224/407 |
| 2002/0162716 A1 | 11/2002 | Fabritz |
| 2004/0238303 A1 | 12/2004 | Hafif |
| 2005/0218171 A1 | 10/2005 | Bellerive |
| 2006/0273534 A1 | 12/2006 | Turner et al. |
| 2007/0228096 A1 | 10/2007 | Lin |

\* cited by examiner

*Primary Examiner* — Justin Larson
(74) *Attorney, Agent, or Firm* — Stephen E. Feldman; Feldman Law Group, P.C.

(57) ABSTRACT

A cart attachment for a backpack is described which includes a flap coupled to an upper back of a backpack. The cart attachment also includes a pair of hooks and loops strips to engage and disengage the flap. The cart attachment has two positions. In the first position, the flap is opened. In the second position, the flap is securely closed to accommodate a detachable wheeled cart. A second cart attachment may also be provided on a bottom portion of the backpack.

9 Claims, 4 Drawing Sheets

CART ATTACHMENT FOR A BACKPACK

BACKGROUND OF THE INVENTION

The invention relates to a cart attachment for a backpack. In particular, the invention relates to backpack incorporating a cart attachment so that a cart may be removably attached to the backpack.

DESCRIPTION OF THE RELATED ART

The prior art shows various designs of backpacks and carts that can be carried on the back and/or wheeled over the floor, respectively. The backpacks and wheeled carts in the art generally include a plurality of compartments and/or pockets. The pockets of a backpack are generally provided on the front and sides of the backpack. The user has trouble accessing the front and side pockets of the backpacks when the backpack is carried on the back of the user. It should also be noted that the user also has trouble accessing the front pockets of a wheeled cart when the cart is wheeled on the floor. The zipper pockets of the backpack or wheeled cart are inconveniently accessed when the backpack is being wheeled or carried on one's back. To access the pockets of the wheeled cart, the user has to stop and change his/her direction to access the front pockets. To access the pockets of the backpack, the user has to remove the backpack on his back to access the front pockets of a backpack, or the user has to perform a painful movement of moving the hands in the backward direction and locate desired element in the front pockets.

Challanan, U.S. Pat. No. 5,934,533 is directed to a carrier for carrying recreational boards. The carrier can be supported by one or more straps. A board is held by a first flap and a second flap. The flaps are held together by hooks and loops securing means.

Challoner et al. U.S. Pat. No. 5,492,254 teaches a carrying case for carrying a recreational board. The carrier case has a base and a first and a second engagement means such as pouch or compartment for securing recreational board to the base. The engagement means includes draw stringing and a strap engaged with another strap.

The prior art doesn't disclose a backpack that may be easily converted from a backpack to a wheeled cart. Additionally, the prior art doesn't disclose a backpack that is easily and conveniently accessed while the backpack is being carried on the back or wheeled on the floor. Particularly, the backpacks in the prior art do not include an attachment that may be used to attach a wheeled cart to a backpack.

The backpacks in the prior art also do not suggest any attachment that is used for safely keeping the valuables that are not accessible by any person when the backpack in carried on the back of the user.

There is a need of a backpack that includes a cart attachment that can be easily converted from a backpack to a wheeled cart while the backpack is being carried by the user. Further there is a need of a cart attachment for a backpack that includes a pair of flaps that can be easily opened and closed by the user when the backpack is being carried.

SUMMARY OF THE INVENTION

A cart attachment for a backpack is described that includes at least one flap that is coupled to the upper back portion of a backpack. When closed, the flap may define an enclosure for a horizontal bar of a cart. In one embodiment, the flap may be securely closed with a pair of hooks and loops strips such as a VELCRO strip. The cart attachment has two configurations. In a first configuration, the cart attachment is opened so that a cart may be placed in the cart attachment. In a second configuration, the cart attachment is closed so that the cart may be secured to the backpack. The cart attachment is easily assessed by the user when the backpack is being wheeled. The user accesses the cart attachment by simply opening the flap to the first configuration. The cart attachment is closed to the second configuration simply by pressing the flap over the horizontal bar to a second strip of VELCRO. In another embodiment, the cart attachment is provided on a bottom portion of the backpack. The first flap and the second flaps are securely coupled to the bottom portions of the backpack so that the flaps surround the bottom portion of a wheeled cart. The cart attachment in this one embodiment has a first opened position and a second closed position. The cart attachment is advantageously used to removably secure the bottom of the backpack to the wheeled cart and may also be used to access items kept in the attachment when the cart is not attached to the backpack without removing the backpack when the backpack is carried by the user on the back.

In another embodiment, the backpack may comprise an upper cart attachment that includes a) at least one upper flap coupled to an upper portion of the backpack, b) a first hook and loop strip being attached to the at least one upper flap and c) a second hook and loop strip being attached to the backpack at a point below the at least one upper flap. And when the upper cart attachment is in a closed position, the first hook and loop strip aligns and engages with the second hook and loop strip so that a top portion of a cart may be secured to the backpack. The backpack may also comprise a lower cart attachment that includes a first lower flap being coupled to a bottom of the backpack and a second lower flap being coupled to a bottom of the backpack. The first lower flap may have a third hook and loop strip while the second lower flap may have a fourth hook and loop strip. And when the lower cart attachment is in a closed position, the third hook and loop strip aligns and engages with the fourth hook and loop strip so that a bottom portion of the cart may be secured to the backpack.

The cart may have a top portion and bottom portion. The top portion of the cart may include a horizontal bar with the second hook and loop strip being attached to the backpack slightly below the horizontal bar of the cart and the upper flap being attached to the backpack slightly above the horizontal bar of the cart. The bottom portion of the cart may have a bottom support structure that includes a platform with the first bottom flap being attached to the backpack on one side of the platform and the second bottom flap being attached to the backpack on the other side of the platform. The cart may also be a wheeled cart that has a handle. And when the cart is secured to the backpack, the backpack may be wheeled and when the cart is not secured to the backpack, the backpack may carried on a back of a user using straps.

In another embodiment, a backpack kit includes a cart and a backpack. The cart includes a top portion and a bottom support structure, the bottom support structure having a first wheel assembly, a second wheel assembly, a first support assembly and a second support assembly at least two wheels and at least two supports, the top portion having a horizontal bar attached between two upright arms, the two upright arms extendin from the horizontal bar in an upwards and downwards direction, in the upwards direction the two upright arms are attached to a handle and in the downward direction the two upright arms are attached to the bottom support structure. The backpack includes (1) an upper cart attachment, the upper cart attachment includes a) at least one upper flap coupled to an upper portion of the backpack, b) a first hook and loop strip being attached to the at least one upper flap and c) a second hook and loop strip being attached to the backpack at a point below the at least one upper flap, wherein, when the upper cart attachment is in a closed position, the first hook and loop strip aligns and engages with the second hook and loop strip so that the at least one upper flap is laid over the horizontal bar and secures the horizontal bar to the backpack; and (2) a lower cart attachment, the lower cart attachment includes a first lower flap being coupled to a bottom of the backpack, a second lower flap being coupled to a bottom of the backpack, the first lower flap is attached to the backpack on a first side of the bottom support structure, the second lower flap is attached to the backpack on a second side of the bottom support structure, the first side being opposite the second side, the first lower flap completely fills the space between the first wheel structure and the first support structure on the first side of the bottom support structure, the second lower flap completely fills the space between the second wheel structure and the second support structure on the second side of the bottom support structure, the first lower flap having a third hook and loop strip and the second lower flap having a fourth hook and loop strip, wherein, when the lower cart attachment is in a closed position, the third hook and loop strip aligns and engages with the fourth hook and loop strip so that the first lower flap and the second flap lower flap surround the bottom support structure of the cart with the first lower flap and the second flap being tightly laid between the first wheel assembly, the second wheel assembly, the first support assembly and the second support assembly the wheels and the supports of the bottom support structure thereby securing the backpack to the bottom support structure of the cart.

DETAILED DESCRIPTION OF THE INVENTION

Figure 1:
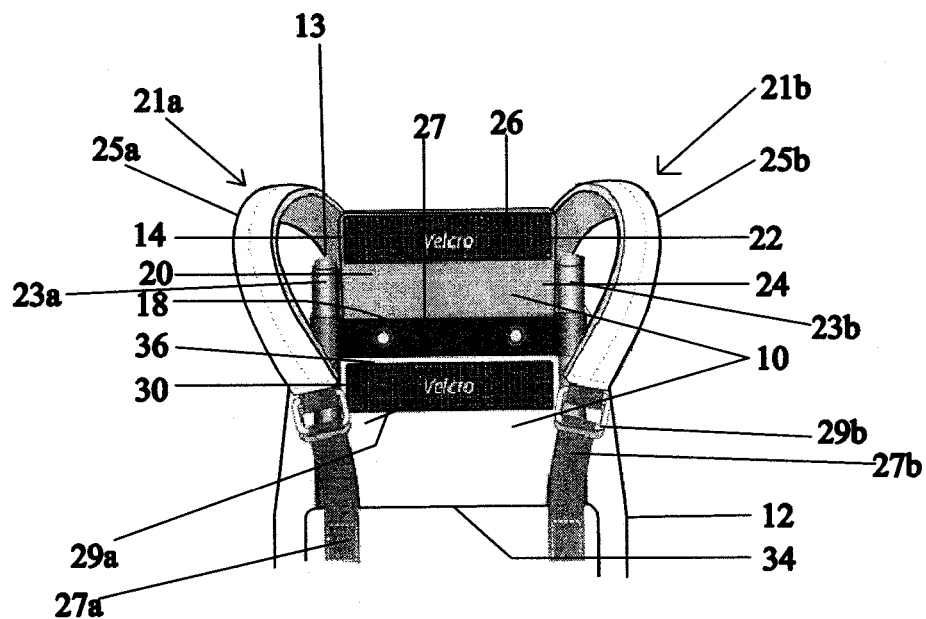
FIG. 1 is a front view of a cart attachment in accordance with the present invention.
Figure 4:
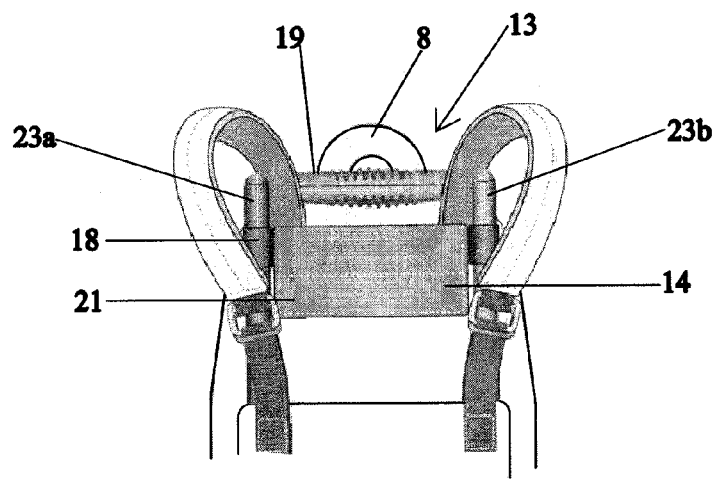
FIG. 4 is a front view of the cart attachment of FIG. 1 in the second configuration.
Figure 5:
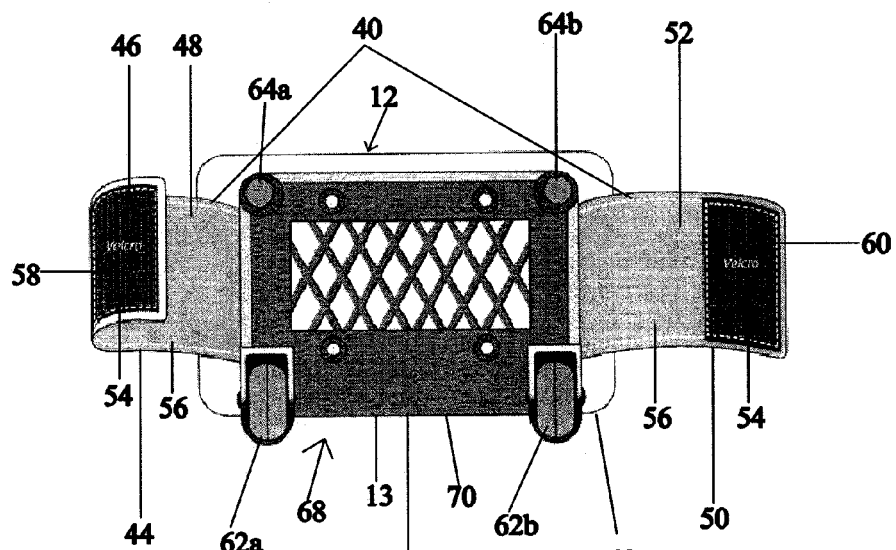
FIG. 5 is a front view of another embodiment of cart attachment of FIG. 1.

Referring to FIG. 1 and FIG. 5, a cart attachment 10, 40 for a backpack 12 in accordance with the preferred embodiment of the present invention is shown. The backpack 12 may include an upper cart attachment 10, a lower cart attachment 40, pocket 34, loop 8 and straps 21a-b having buckles 29a-b between an upper strap 25a-b and a lower strap 29a-b. The upper cart attachment 10 includes a flap 14 that is coupled on an upper portion of backpack 12. The flap 14 may be adhered to the backpack 12 by stitching or some other means. The flap 14 may be rectangular in shape and have an upper section 22 and a lower section 24. The upper section 20 of the flap may include a hook and loop strip 26. A second hook and loop strip 30 may be coupled to the backpack 12 at a point below the flap 14. The cart attachment is used in conjunction with a cart 13. The cart 13 includes a horizontal bar 18 attached two upright arms 23a-b. The two upright arms 23a-b extend from the horizontal bar 18 in an upwards and downwards direction. In the upwards direction the arms 23a-b are attached to a handle 19 (shown in FIG. 4) and in the downwards direction the arms 23a-b are attached to a bottom support structure 68 (shown in FIGS. 5-8). The bottom support structure 68 includes a platform 70, a pair of wheels 62a-b and two supports 64a-b.

The cart attachment 10 has a first position and a second position. In one embodiment, the cart attachment 10 is opened in the first position and the cart attachment is closed in the second position. When closed (shown in FIG. 4), flap 14 defines an enclosure of the cart attachment 10 in the second position. The flap 14 is preferably made of flexible material, for example, resin, polyester, cotton.

The flap 14 has a first side 21 (shown in FIG. 4) and a second side 20, includes a first section 22 and second section 24. Second section 24 has approximately double surface area and height of the first section 22. The first section 22 includes a first hooks and loops strip 26 on the first section such that the hooks and loops 26 is on second side 20 of first flap 14. It is, however, understood that the size of the first section 22 and the first hooks and loops strip 26 is approximately identical.

The hooks and loops strip 26 preferably approximately aligns with the hooks and loops strip 30. Hooks and loops strip 30 is attached to the backpack 12 with stitching or some other means for attaching a hooks and loops strip to a material.

When flap 14 is closed, the flap is laid over the horizontal bar 18. This closure secures the horizontal bar 18 to the backpack 12.

The top edge 36 of the hooks and loops strip 30 approximately aligns with a bottom edge of horizontal bar 18 so that during the closing of the flap 14, the hooks and loops strip 26 of the flap align with the hooks and loops strip 30 with the horizontal bar being enclosed between the two.

In the first configuration, the flap 14 is foldably opened so as to receive the horizontal bar 18.

In the second configuration, the cart attachment 10 is closed by folding the flap 14 over the horizontal bar 18, thereby enclosing the horizontal bar 18. In a second configuration, the flap 14 is folded over the horizontal bar 18 such that the hooks and loops strips 26 and 30 are engaged to securely close the cart attachment 12. The cart attachment 12 in the second configuration is changed to the first configuration by reversing the steps described above.

Figure 2:
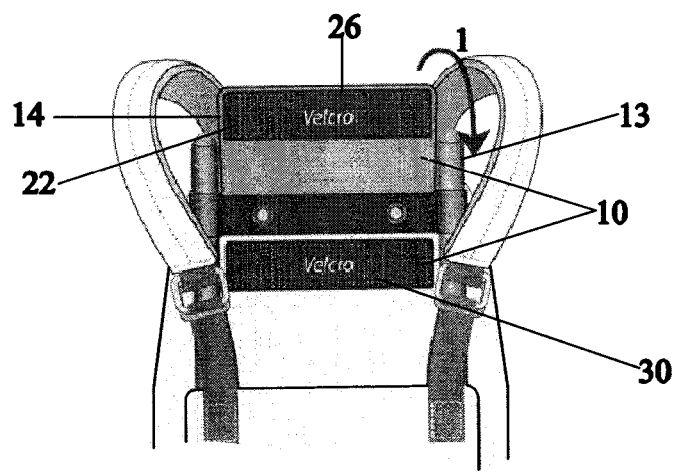
FIGS. 2 and 3, show steps involved in changing a first configuration of a cart attachment of FIG. 1 to a second configuration.
Figure 3:
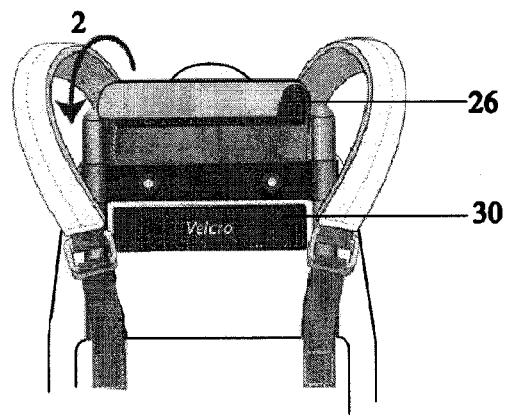

Referring to FIGS. 2, 3 and 4, steps involved to close and open the cart attachment 12 are described. Initially, the flap 14 is in a flat open position to accommodate the horizontal bar 18 in the cart attachment 10 to define a first open configuration. In a second step, the flap is folded over the horizontal bar 18 in a direction indicated by arrow 1 and hooks and loops strip 26 and 30 are aligned. In a third step, the first hooks and loops strip 26 is moved towards the second hooks and loops strip 30 in a direction indicated by arrow 2.

In a fourth step, the first hooks and loops strip 26 and the second hooks and loops strips 30 are engaged to close the cart attachment 12 to define the second configuration. In the second configuration, the flap 14 overlaps horizontal bar 18 and the hooks and loops strip 26 of first section 22 engages with the hooks and loops strip 30.

In another embodiment, as shown in FIG. 5, the cart attachment 40 for a bottom portion of the backpack 12 in accordance with the preferred embodiment of the present invention is shown. In this one embodiment, cart attachment 40 includes a pair of opposed flexible flaps that are coupled along opposite ends of the bottom portion 42 of the backpack 12.

In one embodiment, a first flap 44 that is approximately rectangular in shape has a first side 46 and a second side 48. A second flap 50 that is approximately identical to first flap 44 also includes a first side 53 (shown in FIG. 7 and FIG. 8) and a second side 52. Each of the flaps 44 and 50 include a first section 54 and a second section 56. In one embodiment, second section 56 preferably has a greater area than first section 54. Each of the flaps 44 and 50 is securely coupled with the bottom portion 42 with respective first sections 54. The first section 54 of each of the flaps 44 and 50 defines a free end of the flap.

In one embodiment, the first section 54 of the first flap 44 includes a first hooks and loops strip 58 on the first side 46. The first hooks and loops strip 58 is approximately identical with the first section 46. The first section 54 of second flap 50 includes a second hooks and loops strip 60 on the second side 56. The cart attachment 40 has two configurations. In a first configuration, the cart attachment is opened and in a second configuration, the cart attachment is closed.

Figure 6:
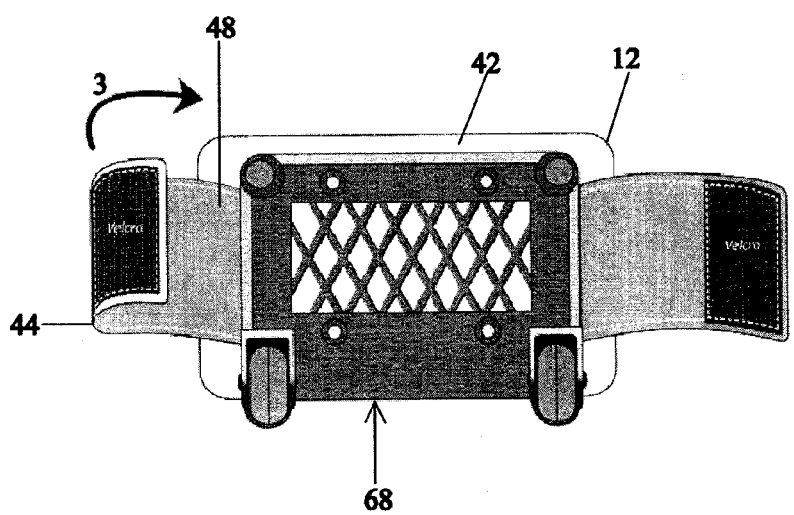
FIGS. 6 and 7 show steps involved in changing a first configuration of the cart attachment of FIG. 5 to a second configuration.
Figure 7:
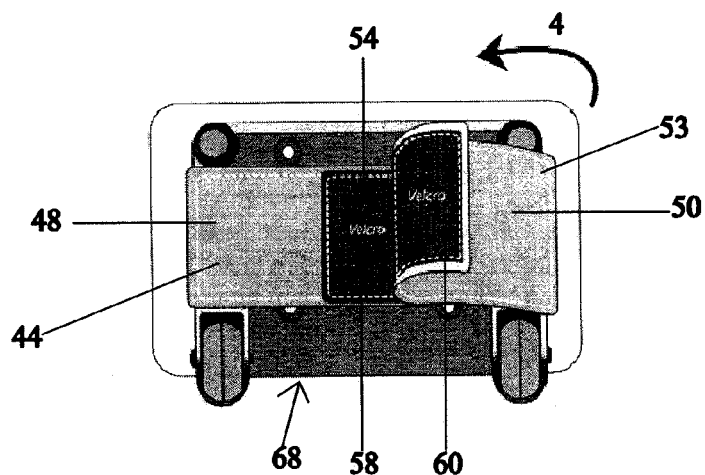
Figure 8:
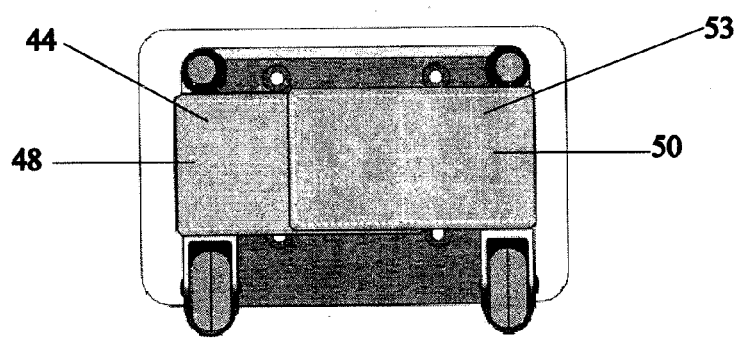
FIG. 8 is a front view of the cart attachment of FIG. 5 in the second configuration.

Referring to FIGS. 6, 7 and 8, steps involved in closing the cart attachment from first open configuration to second closed configuration are described. In a first step, the first flap 44 is moved towards the bottom portion 42 of the backpack 12 in a direction indicated by arrow 3. The first flap 44 is in a flat rested position over the platform 70 of the bottom support structure 68 (see FIG. 6).

In a second step, the second flap 50 is moved towards the second section 48 of the first flap 44 in a direction indicated by the arrow 4. In this step, the first hooks and loops strip 58 faces the second hooks and loops strip 60. In a third step, the first flap 46 and second flap 50 are securely engaged by pressing the respective hooks and loops strips 58 and 60. The first flap 44 and second flap 50 surround the platform 70 of the bottom support structure 68 of the cart 13 to close the cart attachment 12 with the flaps being laid between the wheels 62a-b and the supports 64a-b of the bottom support structure 68. The cart attachment 40 is opened to the first configuration by reversing the steps described above.

Now referring to FIGS. 1-8, in operation, the backpack 12 may be carried on the back of a user and when desired a user may attach a wheeled cart 13 to the backpack 12 using the cart attachment 10. Once attached, the backpack 12 may be wheeled by the user. Additionally, the cart attachment 10 on the upper portion of the backpack 12 may be used so a user can keep desired items, for example, a diary, a costume, a scarf, educational material etc. in the enclosure defined the cart attachment 10.

The cart attachment 10 is also very useful when the backpack 12 is carried on the user's back. Cart attachment 10 is an additional secured pocket to safely keep valuables such as wallet, money bag, documents etc. The cart attachment 10 is used to carry various items, for example, piece of a cloth, sand bags etc., to gives cushioning effect to the user's back.

The cart attachment 10 on the back of the backpack 10 advantageously safely protects the valuables inside the cart attachment 10 while the backpack 12 is carried on the user's back. In this configuration, the cart attachment 10 is positioned between the user's back and the backpack 10. Hence, the cart attachment 10 cannot be accessed externally from the back side when the user is facing on the front.

The cart attachment 40 on the bottom portion of the backpack 12 is advantageously used when the backpack 12 is being carried by the user on back. In this configuration, the user can access the flaps 44 and 50 on the bottom portion 42 by just opening the flaps using the preferred method. The cart attachment 40 is advantageously used to carry a laptop, a card board, a pair of shoes etc. The user can easily access the cart attachment by removing the flap by one hand and taking the item by the other hand without removing the backpack.

What is claimed is:

1. A backpack kit comprising:
   a cart, the cart including a top portion and a bottom support structure, the bottom support structure having a first wheel assembly, a second wheel assembly, a first support assembly and a second support assembly, the top portion having a horizontal bar attached between two upright arms, the two upright arms extending from the horizontal bar in an upwards and downwards direction, in the upwards direction the two upright arms are attached to a handle and in the downward direction the two upright arms are attached to the bottom support structure; and
   a backpack including:
   an upper cart attachment, the upper cart attachment includes a) at least one upper flap coupled to an upper portion of the backpack, b) a first hook and loop strip being attached to the at least one upper flap and c) a second hook and loop strip being attached to the backpack at a point below the at least one upper flap, wherein, when the upper cart attachment is in a closed position, the first hook and loop strip aligns and engages with the second hook and loop strip so that the at least one upper flap is laid over the horizontal bar and secures the horizontal bar to the backpack; and
   a lower cart attachment, the lower cart attachment includes a first lower flap being coupled to a bottom of the backpack, a second lower flap being coupled to a bottom of the backpack, the first lower flap is attached to the backpack on a first side of the bottom support structure, the second lower flap is attached to the backpack on a second side of the bottom support structure, the first side being opposite the second side, the first lower flap completely fills the space between the first wheel structure and the first support structure on the first side of the bottom support structure, the second lower flap completely fills the space between the second wheel structure and the second support structure on the second side of the bottom support structure, the first lower flap having a third hook and loop strip and the second lower flap having a fourth hook and loop strip, wherein, when the lower cart attachment is in a closed position, the third hook and loop strip aligns and engages with the fourth hook and loop strip so that the first lower flap and the second flap lower flap surround the bottom support structure of the cart with the first lower flap and the second flap being tightly laid between the first wheel assembly, the second wheel assembly, the first support assembly and the second support assembly of the bottom support structure thereby securing the backpack to the bottom support structure of the cart; wherein the upper flap and lower flaps are the only attachment between the backpack and the cart.

2. The cart attachment of claim 1 wherein the second hook and loop strip is attached to the backpack slightly below the horizontal bar of the cart.

3. The cart attachment of claim 1 wherein the upper flap is attached to the backpack slightly above the horizontal bar of the cart.

4. The cart attachment of claim 1 wherein the bottom support structure includes a platform.

5. The cart attachment of claim 4 wherein the first bottom flap is attached to the backpack on one side of the platform and the second bottom flap is attached to the backpack on the other side of the platform.

6. The cart attachment of claim 1 wherein the cart is a wheeled cart.

7. The cart attachment of claim 1 wherein, when the cart is secured to the backpack, the backpack may be wheeled.

8. The cart attachment of claim 1 wherein the backpack has straps.

9. The cart attachment of claim 8 wherein, when the cart is not secured to the backpack, the backpack may carried on a back of a user via the straps.

* * * * *